W. L. HAMILTON.
BEE-HIVE.
No. 172,430.
Patented Jan. 18, 1876.
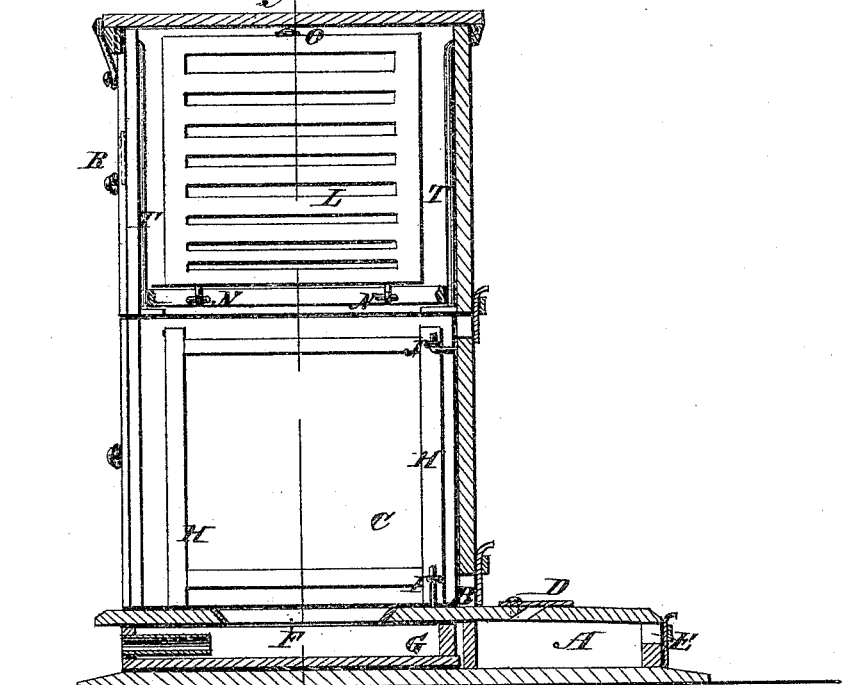
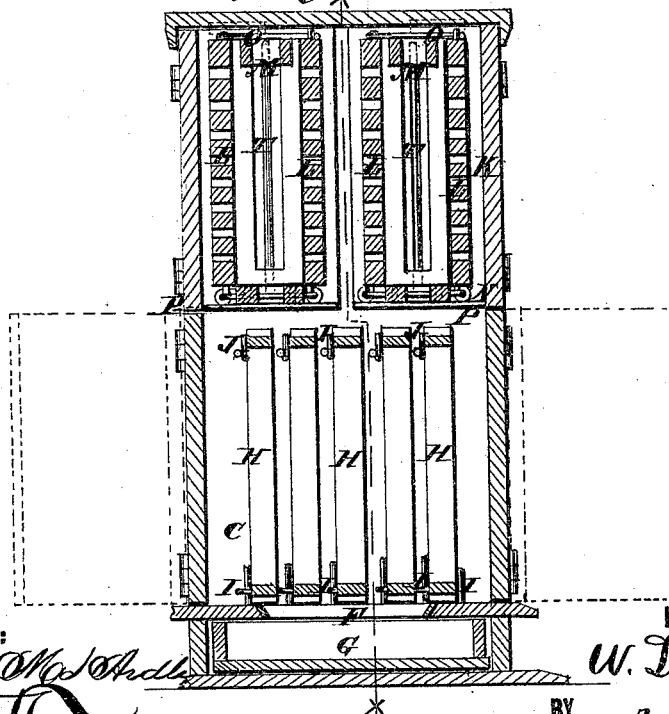
WITNESSES:
INVENTOR:
W. L. Hamilton
BY
ATTORNEYS.

UNITED STATES PATENT OFFICE.

WILLIAM L. HAMILTON, OF GLASGOW, KENTUCKY.

IMPROVEMENT IN BEE-HIVES.

Specification forming part of Letters Patent No. 172,430, dated January 18, 1876; application filed September 4, 1875.

*To all whom it may concern:*

Be it known that I, WILLIAM L. HAMILTON, of Glasgow, in the county of Barren and State of Kentucky, have invented a new and Improved Bee-Hive, of which the following is a specification:

The invention will first be described in connection with drawing, and then pointed out in the claim.

Figure 1 is a sectional elevation of my improved bee-hive, taken on the line $x\ x$ of Fig. 2; and Fig. 2 is a sectional elevation taken on line $y\ y$ of Fig. 1.

Similar letters of reference indicate corresponding parts.

A is the box for the decoy of the drones from the passage B, to be temporarily closed for the purpose, into the lower chamber C of the hive, said box being in a projection of the base of the hive, and being provided with a slide, D, to close the passage into it from time to time to secure the drones, and it also has a passage and a slide, E. F is a trap below the chamber C, to receive the moths as they are thrown down by the bees, on the bottom of which is a drawer, G, to be taken out from time to time to kill the moths. The lower story C is filled with removable racks or comb-frames H, which are detachably secured by wires I and J, so that they can be readily taken out for establishing colonies when desired. In the upper chamber K are honey-boxes, made of open or lattice frames L and M, jointed together at the bottom by wires N, and hooked together at the top by wires O, to be opened readily for taking out the honey. Under these frames are slides P, to cut off the bees from below when the honey-boxes are to be opened, and in the back of the upper story is a passage, R, with a slide to be opened when the slides P are closed, to allow the bees that may be in the upper chamber at that time to escape before opening the boxes. The honey-boxes in the upper chamber go in from the top on slides T, which keep them in place. The back of the hive is divided in the middle and connected to the sides, which swing open on the front to afford access to the hive.

Having thus described my invention, I claim as new and desire to secure by Letters Patent—

A bee-hive provided with the latticed frames L M, working in and out of upper chamber on slides T, and held detachably together by wires N O, as and for the purpose specified.

WILLIAM L. HAMILTON.

Witnesses:
JOHN B. FARRIS,
RICHARD F. BETHEL.